Figure 16:
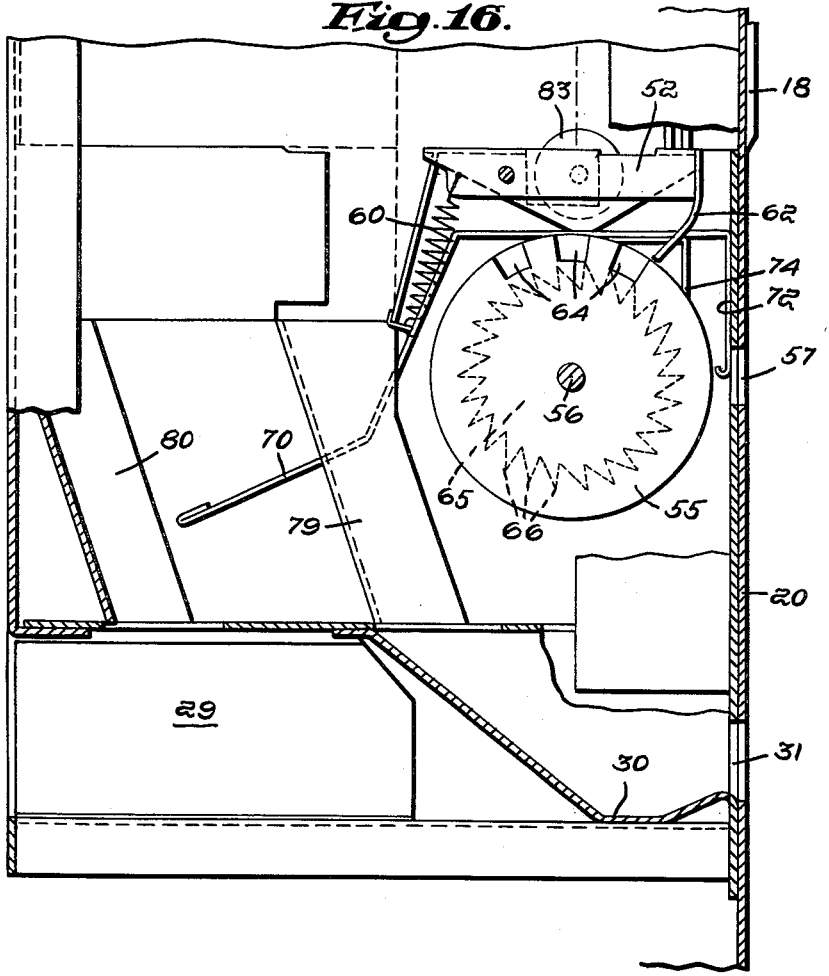

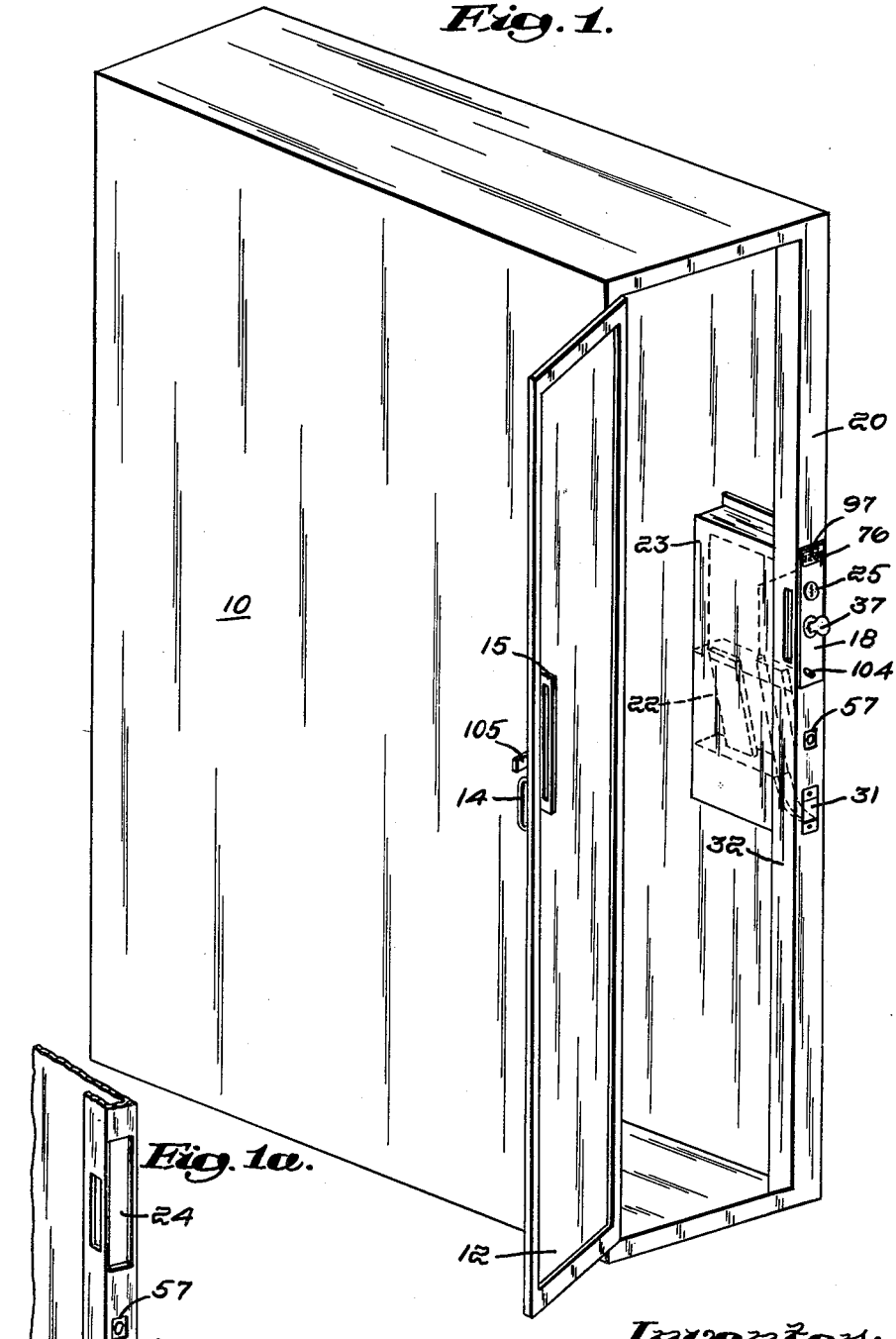

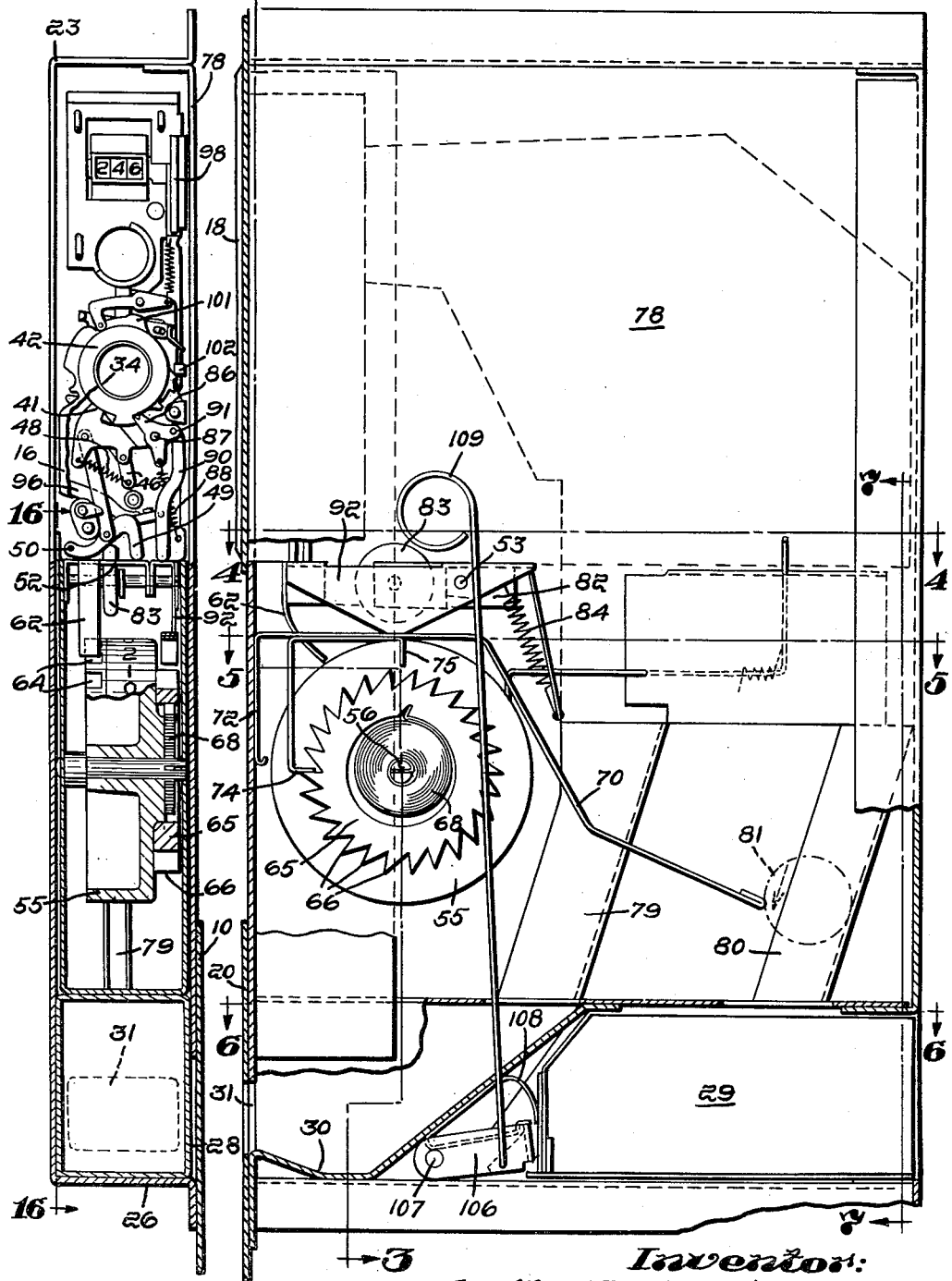

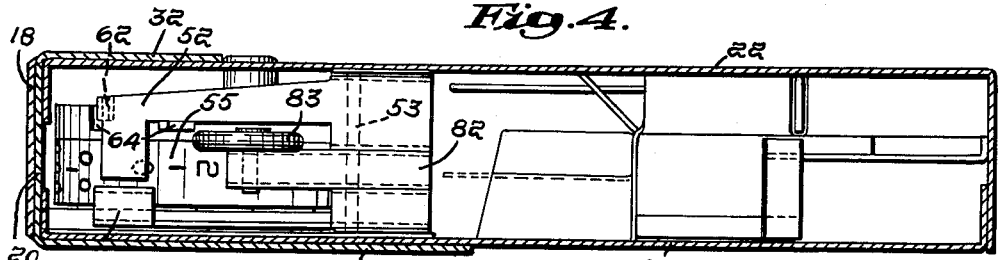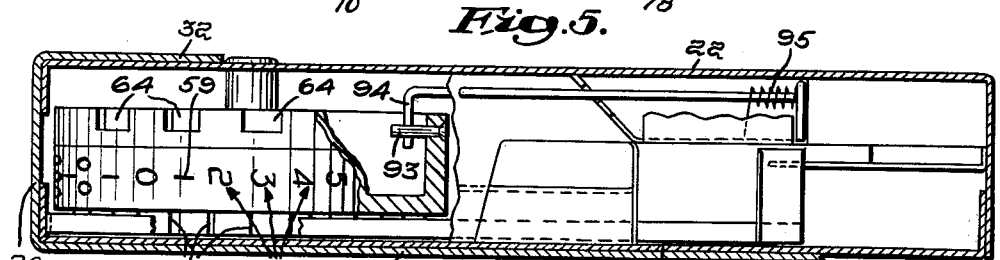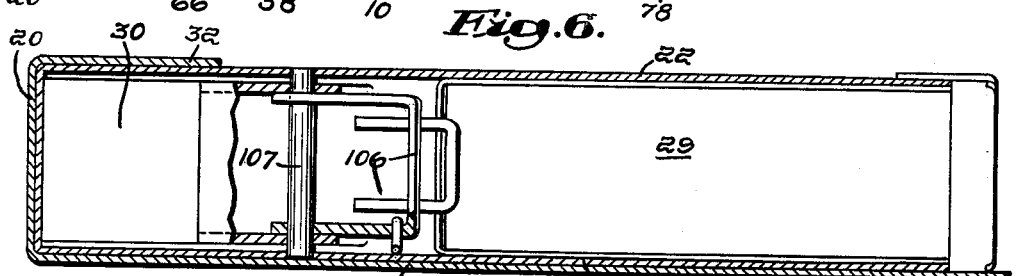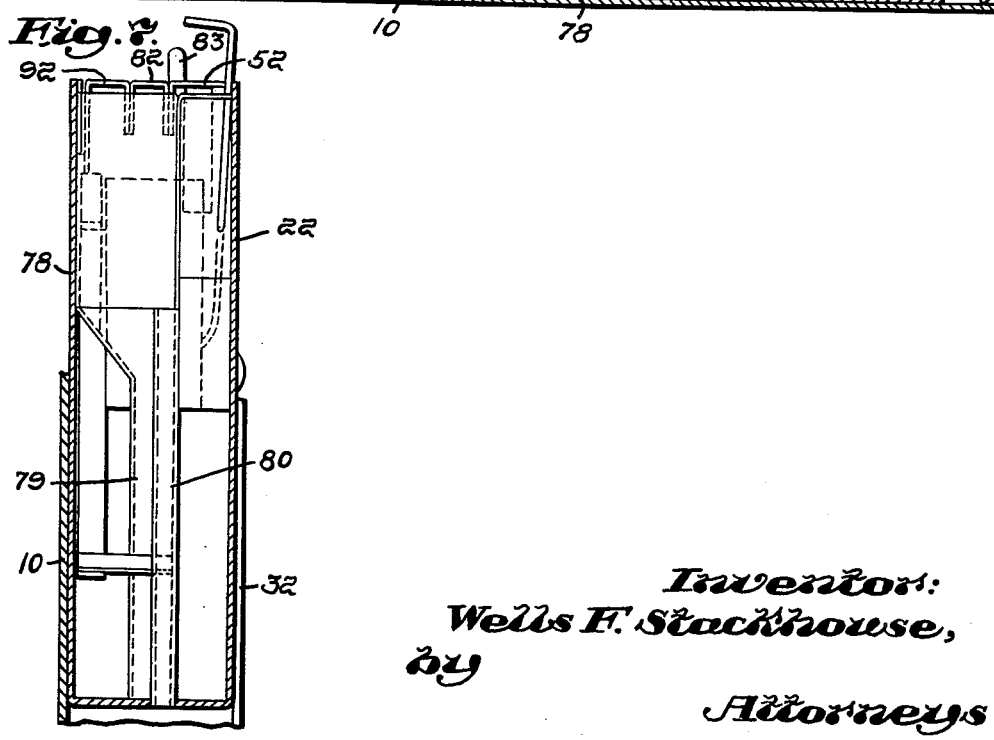

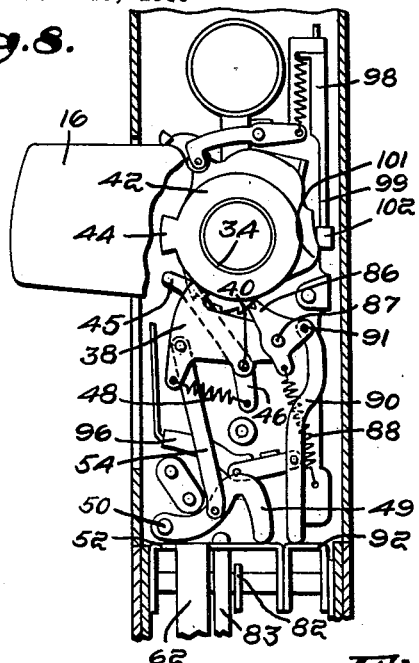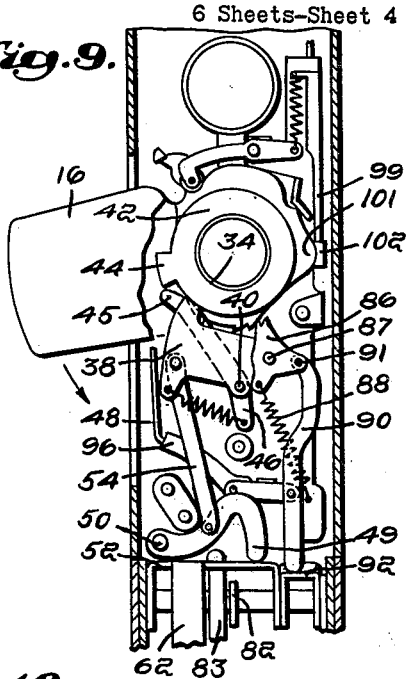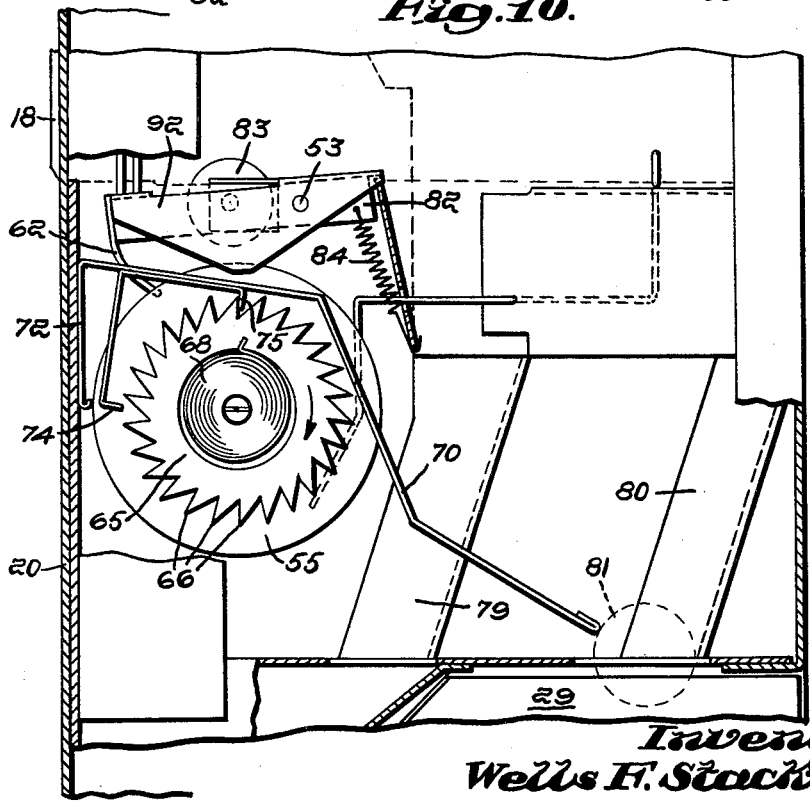

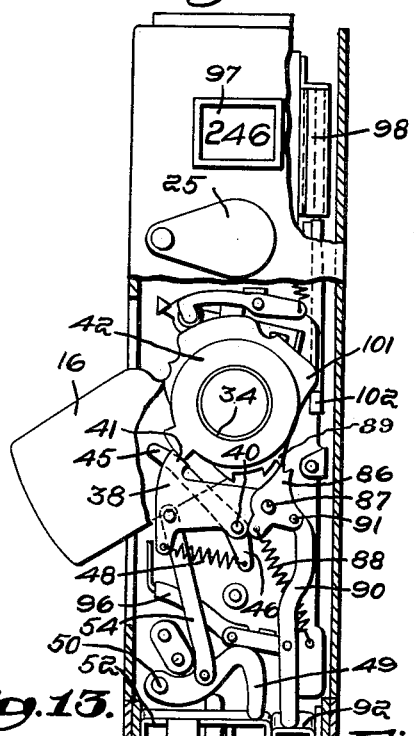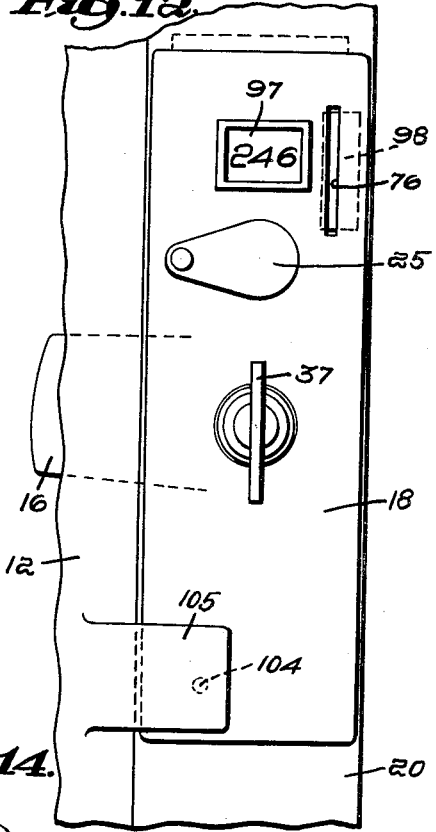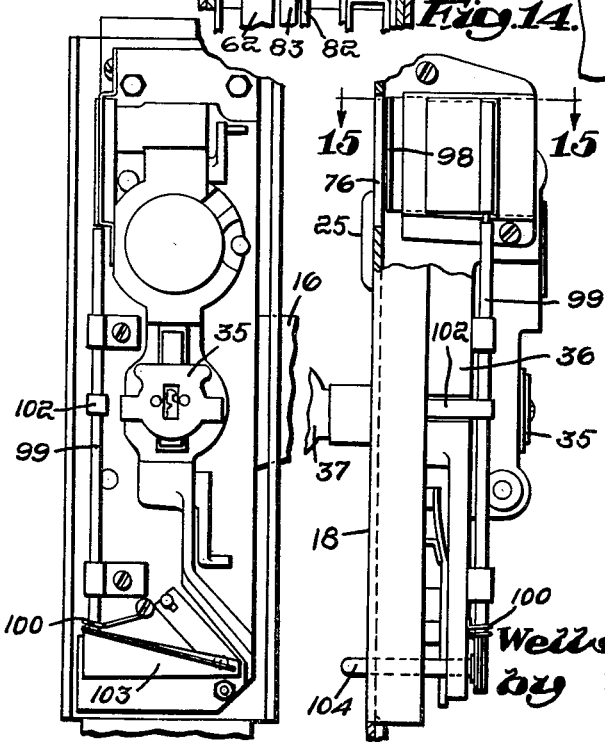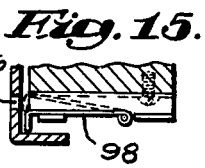

Aug. 21, 1962 W. F. STACKHOUSE 3,050,169
CHECKING LOCKER
Filed Feb. 18, 1960 6 Sheets-Sheet 6

Inventor:
Wells F. Stackhouse,
by KENWAY, JENNEY, WITTER & HILDRETH
Attorneys

Patent text 3,050,169
CHECKING LOCKER
Wells F. Stackhouse, Andover, Mass., assignor to American Locker Company, Inc., Boston, Mass., a corporation of Delaware
Filed Feb. 18, 1960, Ser. No. 9,614
14 Claims. (Cl. 194—19)

This invention relates to checking lockers and particularly to a novel locker adapted to receive and retain in locked condition goods deposited in the locker, together with manually adjustable mechanism associated with the locker for selectively setting up one of a plurality of predetermined cash due amounts and means for releasing the lock and permitting its movement to unlocked position when cash of the predetermined amount set up is deposited in the locker. The lockers are adapted to serve various vending and service uses such, for example, as the depositing in the locker of laundry and dry cleaning products to be serviced and the reclaiming of the serviced products from the locker merely by depositing the required service charge amount in the locker. The production of a locker mechanism of this nature and for the purpose described comprises the primary object of the invention.

An important aspect of my invention contemplates the employment of a lock mechanism and an accumulator mechanism as independent units but so juxtaposed in the locker that they cooperate automatically to perform the functions above described. Each of such units is self-contained and means is provided for supporting the units in such juxtaposed position in the locker that they cooperate to perform the said functions, the units being freely and independently removable from the locker and replaceable with other like units.

A further feature of the invention relates to novel mechanism associated with the lock bolt and the coin receiving slot in the lock for blocking the slot against the insertion of a coin by another prospective patron when the locker is in use and in locked position, and including means for automatically opening the slot when the patron inserts the key and moves the bolt in the unlocking direction.

These and other features of the invention will be best understood and appreciated from the following description of a prefored embodiment thereof selected for purposes of illustration and shown in the accompanying drawings in which—

FIG. 1 is a perspective view of a checking locker embodying my invention,
FIG. 1a is a fragmentary view of the locker,
FIG. 2 is an enlarged fragmentary elevation of a portion of the locker, partially broken away,
FIG. 3 is a sectional view taken on line 3—3 of FIG. 2, with parts broken away,
FIG. 4 is a plan section taken on line 4—4 of FIG. 2,
FIG. 5 is a plan section taken on line 5—5 of FIG. 2,
FIG. 6 is a plan section taken on line 6—6 of FIG. 2,
FIG. 7 is a sectional view taken on line 7—7 of FIG. 2,
FIG. 8 is an enlarged fragmentary view like FIG. 3 and showing the lock in door locking position,
FIG. 9 is a like view showing the locking bolt slightly rotated in the unlocked direction,
FIG. 10 is a view like FIG. 2 but showing the parts in another position,
FIG. 11 is a view like FIG. 9, but showing the bolt further rotated in the unlocking direction,
FIG. 12 is a fragmentary view showing the lock in front elevation,
FIG. 13 is a rear elevation of the lock,
FIG. 14 is a side elevation thereof,
FIG. 15 is a fragmentary sectional view taken on line 15—15 of FIG. 14, and
FIG. 16 is a sectional view taken on line 16—16 of FIG. 3.

The invention contemplates a checking locker particularly adapted to serve the requirements of servicing or merchandizing operations wherein specific goods are to be stored and thereafter reclaimed or secured by the patron upon payment of a predetermined cash due amount. Each locker comprises a chambered cabinet for receiving the goods together with means for locking the cabinet in closed position, means for setting up the cash amount due and means whereby the patron can open the cabinet and secure the goods upon depositing therein the cash due amount. In the accompanying drawings I have for purposes of illustration shown one embodiment of the invention which will be described.

In FIG. 1 I have illustrated a chambered cabinet 10 provided with a closure door 12, it being understood that as many of the cabinets will be provided at each distributing location as is necessary to serve the requirements. The door is provided with a handle 14 and a slotted hasp 15 for receiving the door locking bolt 16 of a lock unit 18 secured to the marginal door portion 20 of the cabinet. Disposed to cooperate with the lock unit 18 is an accumulator unit mounted within a rectangular box 22 (FIG. 7) and embodying mechanism for manually and selectively setting the same to a plurality of positions respectively representing different cash due amounts and including mechanism for releasing the lock when the patron deposits the required amount due in the locker, all as hereinafter specifically described.

The door marginal portion 20 of the cabinet is cut out at 24 to receive the lock unit 18 which is secured therein in the position illustrated in FIG. 1 by a lock at 25 in the manner fully described in Patent 2,437,742. Inwardly of the wall 20 of the cabinet is provided with a built-in box 23 having a shelf 26 beneath the opening 24 (FIG. 3) for supporting a box 28 within which is a cash box 29 and a coin return cup 30 open to the front of the cabinet at 31. The accumulator unit 22 is inserted into the cabinet through the opening 24, rests on the box 28, is freely removable from the cabinet and is supported laterally therein by the walls 32 and 33 (FIGS. 1 and 3). When the lock unit 18 is in place in the cabinet it is disposed directly above and adjacent to the accumulator unit 22 as illustrated in FIGS. 2 and 3.

The lock unit 18 comprises a cradle 34 rotatably mounted in a frame 36 and adapted to receive a lock barrel 35 (FIG. 13) having a key 37, all as described in Patent 2,437,742. The bolt 16 is carried by and moves with the cradle. A lever 38 pivoted to the frame at 40 has a lug 41 disposed to engage the periphery of a disk or cam 42 fixed to the cradle. When the lock is in unlocked position (FIG. 3) a lug 44 on the disk is disposed to contact one side of the lug 41 and prevent locking rotation of the cradle, and when the lock is in locked position (FIGS. 8 and 9) the lug 44 is disposed to contact the other side of the lug 41 and prevent full unlocking rotation of the cradle. A lever pivoted at 40 has one arm 45 in contact with the disk 42 and another arm 46 connected by a spring 48 to the lever 38, the spring normally holding the arm 45 in contact with the disk. A lever 49 pivoted to the frame 36 at 50 is in abutting contact with a member 52 pivoted at 53 on the accumulator unit 22. A link 54 connects the lever 38 and 49 and it will be apparent that with the parts in the position of FIGS. 3 and 8 the lever 38 will be held upwardly in locking engagement with the disk 42.

The member 52 provides a stop abutment for the lever 49 and while the member 52 remains in the elevated position shown in FIGS. 3, and 8 and 9 the lever 38 will prevent rotation of the bolt from either locked or unlocked position to the other position. The disc 42 and lug 44 are of a width to span both lever 38 and arm 45 and if, as shown in FIG. 9, the lock is rotated in the unlocking direction the lug 44 will move beneath the arm 45 and, functioning as a cam, will pivot the arm outwardly independently of the lever 38, the spring 48 permitting this movement and the lug 41 remaining in position to be engaged by the lug 44. The same action takes place if the lock is rotated in the locking direction from the position of FIG. 3. If the member 52 is permitted to drop to the position of FIG. 11, rotation of the lock from either position (FIGS. 3 and 8) will move the lug 44 beneath the arm and force the arm and lever 38 outwardly as a unit to the position shown in FIG. 11 whereupon the lock is free to rotate in either direction.

The accumulator unit comprises a cylindrical accumulator 55 mounted for rotation on a fixed shaft 56 within the box 22 beneath the member 52, the periphery of the accumulator being disposed rearwardly adjacent to a window opening 57 through the wall 20 of the cabinet. The cylindrical periphery of the accumulator is graduated at 58 for observation through the window 57 from "0" forwardly to indicate a plurality of consecutive positions starting with "1" at 59 and respectively representing progressively increasing cash due amounts, as illustrated in FIG. 5. A spring 60 normally holds the member 52 in the elevated position of FIG. 16 and a leg 62 extending downwardly from the forward end of the member is disposed to contact the cylinder periphery of the accumulator which thus serves as an abutment positively holding the member in elevated position. The accumulator is notched at 64 to receive the leg 62 and thus permit downward pivotal movement of the member and this notch is positioned thus to receive the leg when the "0" graduation is at the window 57.

An escapement mechanism is provided for giving the accumulator a step by step rotation corresponding to the graduations 58. This mechanism comprises a wheel 65 fixed to rotate with the accumulator and having teeth 66 at its periphery equally spaced and corresponding to the graduations. A spring 68 fixed at one and to the shaft 56 and at its other end to the wheel normally rotates the wheel clockwise (FIGS. 2 and 10). Cooperating with the escapement wheel is a resilient arm 70 fixed to the box 22 at 72 and having two stops 74 and 75 for cooperating with the wheel teeth 66. When the arm is in the normal position of FIG. 2 the stop 74 provides an abutment contact for the adjacent tooth 66 and holds the wheel against clockwise rotation. When the arm is pivoted downwardly as illustrated in FIG. 10 the stop 75 moves into tooth engaging position as the stop 74 moves out and the wheel continues its rotation to the next step position permitted by the stop 74 when the arm returns to normal position. Thus the accumulator is rotated one step at each full pivotal movement of the arm.

The function to be served by the accumulator unit 22 is to prevent movement of the lock from either locked or unlocked position to the other position until the patron has deposited into the locker the due amount indicated at the window 57. The mechanism specifically illustrated in the drawings is adapted to be coin operated and the accumulator is designed to be manually set to the number of coins due and required to effect operation of the lock, each of the unit graduations at 58 representing one or a plurality of coins. When used as a service checking locker such, for example, as servicing laundry or garments to be cleaned, the cabinet will normally be left in the unlocked position of FIG. 3 with the "1" graduation indicated at 59 located at the window 57. In such position the patron can open the door and deposit in the cabinet his goods to be serviced. However he cannot lock the door until he has deposited the required coin in a coin slot 76 provided for this purpose. Such provision prevents use of the locker without payment of an initial charge.

It will be understood that the coin required to open the lock can be of any predetermined denomination such for example as a nickel, dime or quarter. Conventional mechanism is provided at 78 rearwardly of the lock unit for receiving the deposited coin and directing it into a chute 79 or a chute 80. Any improper coins deposited will be returned through the chute 79 to the coin return cup 30, whereas a proper coin 81 will be directed downwardly through the chute 80 and depress the arm 70. The escapement mechanism will thereupon rotate the accumulator 55 one step clockwise (FIG. 2) and bring the "0" to the window 57. The patron thereupon locks the door, removes the key 37 and retains it as his check.

Thereafter the collector removes the lock unit 18 by employing a key for the lock 25, removes the goods and replaces the unit 18, leaving the door locked. When the goods are ready for delivery the lock unit 18 is again removed and the finished goods placed in the locker. Before replacing the unit 18, the collector works through the following described mechanism to set the accumulater to the amount due from the patron. An arm 82 pivoted at 53 (FIGS. 4 and 10) carries a roller 83 on its free end above the accumulator 55 and a spring 84 normally holds the arm and roller in raised position. By reaching through the opening 24 the collector presses the roller downwardly onto the accumulator and rotates both to bring the accumulator to the required position.

If, for example, the service charge is $1.00 and the coin denomination employed is a twenty-five cent quarter, the accumulator would be set with the "3" at the window 57. The patron will thereupon be required to deposit three quarters to bring the accumulator to "0" position, it being understood that each deposited coin rotates the accumulator one step and that the patron made an initial deposit of one quarter. Following this setting, the lock unit 18 is replaced in door locking position whereupon the patron can secure his goods upon depositing the required coins.

As heretofore stated, the service locker is initially left in unlocked position but with the accumulator set to the "1" graduation indicated at 59, thereby requiring the depositing of a coin before the cabinet can be locked. The following described mechanism is provided for automatically resetting the accumulator to a "1" position should the patron return and reclaim his goods before the collector arrives, and for this purpose a second "1" is provided on the accumulator below the "0" as shown in FIG. 5. A member 86 pivoted to the lock frame 36 at 87 (FIG. 8) is normally held in contact with a disk 101, fixed to and disposed rearwardly of the disk 42, by a spring 88 attached to the member and frame. A link 90 connected to the member at 91 extends downwardly into contact with the forward end of an arm 92 pivoted on the unit 22 at 53 and resting on the escapement arm 70 (FIG. 2). When the lock bolt is rotated from the locked position of FIG. 8 to the unlocked position of FIG. 3, teeth 89 projecting outwardly from the disk 101 rotate the member 86 clockwise and depress the arms 92 and 70, thereby tripping the escapement and rotating the accumulator to the second "1" position. The teeth 89 also cooperate with teeth on the member 86 to prevent return rotation of the bolt in the door locking direction before it has been rotated fully to the unlocked position shown in FIG. 3. As illustrated in FIG. 5 a "00" graduation follows the second "1" graduation as also does a third "1" graduation and a "000" graduation, all of which provides for repeats of the operation described. A stop position follows the "000" graduation and in this position a pin 93 carried by the accumulator comes into abutting contact with a stop arm 94 normally held in fixed stop position by a spring 95 (FIG. 5). A connection 96 from the link 90 (FIG. 11) is adapted to operate the counter at 97.

When the lock is in the locked position of FIG. 8 the cabinet is in use and at this time a shutter 98 blocks the coin slot 76 against the insertion of a coin by another prospective patron. The shutter is mounted on the top end of a shaft 99 rotatably mounted in the lock frame 36. The free end of an arm 103 fixed to the bottom end of the shaft bears against a pin 104 slidably mounted to project forwardly through the front plate 18 of the lock and a spring 100 on the shaft engages the arm and normally forces the arm forwardly and the pin outwardly to the position shown in FIGS. 1 and 14. When the door is closed a lug 105 thereon engages and forces the pin inwardly and such movement rotates the shaft and shutter to the coin slot closing position shown in broken lines in FIG. 15. The pin 104 and its function are fully described in said Patent 2,437,742. When the patron returns and inserts the key in the lock the bolt is free to move from the position of FIG. 8 to that of FIG. 9 and during this movement an outwardly projecting lug on the member 101 engages an arm 102 fixed to the shaft 99 and rotates the shaft and shutter to the full line position of FIG. 15. The patron can then insert the required coins through the slot.

The cash box 29 is slidably supported in the box 22 and is held therein by a latch 106 pivoted at 107 and held in latching position by a spring 108. A rod 109 is provided for lifting the latch whereupon the cash box can be withdrawn.

Having thus disclosed my invention what I calim as new and desire to secure by Letters Patent is:

1. Checking locker mechanism comprising in combination, a chambered cabinet, a door therefor, a movable bolt for locking the door in closed position, key operated mechanism for moving the bolt to the door locked and unlocked positions, an accumulator mounted for stepped selective manual movement forwardly from zero position to a plurality of consecutive positions respectively representing different cash due amounts, means including the accumulator for permitting movement of the bolt from either of said positions to the other position when the accumulator is at zero but preventing such movement when the accumulator is in any of said predetermined positions, a spring normally returning the accumulator back to zero position, an escapement mechanism normally preventing such return movement, coin receiving and controlling mechanism, and means cooperating with said coin receiving and controlling mechanism and said spring and escapement mechanism for effecting said return movement of the accumulator one step for each coin deposited in the coin receiving mechanism.

2. The combination defined in claim 1 plus a further stepped position on the accumulator rearwardly adjacent to said zero positon, and means operatively associated with said key operated mechanism and including said spring for automatically moving the accumulator rearwardly from said zero position to said further stepped position when the bolt is moved from the door locked position to the unlocked position.

3. The combination defined in claim 2 plus a further zero positon on the accumulator rearwardly of said further stepped position, and stop means preventing rearward movement of the accumulator beyond a predetermined position rearwardly of said further zero position.

4. The combination defined in claim 1 plus a rotary lock member supporting said bolt and movable therewith, said means for preventing movement of the bolt to door locked and unlocked positons including a pivoted lever, means cooperating with the accumulator for holding the pivoted lever in locking engagement with said member when the accumulator is in any of said predetermined positions, and means for withdrawing the lever from said locking engagement when the member is rotated and the accumulator is in zero positon.

5. The combination defined in claim 4 in which the accumulator is a rotary member and said means cooperating with the accumulator includes abutments on and about the rotary axis of the member and means connected to the pivoted lever and disposed to hold the pivoted lever in said locking engagement by pressure contact with said abutments.

6. The combination defined in claim 5 in which the means for withdrawing the lever from said locking engagement includes a cam on said rotary lock member, an arm pivoted to the lever and a spring connected to the arm and lever and normally operative to hold the arm in contact with the cam, resiliency of the spring permitting pivotal movement of the arm by the cam when the lever is held in said locking engagement with said lock member.

7. The combination defined in claim 1 in which said bolt and key-operated mechanism are embodied in a self-contained lock unit including pivoted mechanism for preventing said movement of the bolt to door locked and unlocked position and in which said accumulator and escapement mechanism are embodied in a second and independent unit including stop means for cooperating with said pivoted mechanism, and means for receiving and supporting said units in juxtaposed relation in the cabinet with said pivoted mechanism in abutting relation with said stop means.

8. Checking locker mechanism comprising in combination, a chambered cabinet, a door therefor, a movable bolt for locking the door in closed positon, key operated mechanism for moving the bolt to the door locked and unlocked positions, an accumulator mounted for stepped selective manual movement forwardly from zero position to a plurality of consecutive positions respectively representing different cash due amounts, means including the accumulator for permitting movement of the bolt from locked positon to unlocked position when the accumulator is at zero but preventing such movement when the accumulator is in any of said predetermined positions, a spring normally returning the accumulator back to zero position, an escapement mechanism normally preventing such return movement, coin receiving and controlling mechanism, and means cooperating with said coin receiving and controlling mechanism and said spring and escapement mechanism for effecting said return movement of the accumulator one step for each coin deposited in the coin receiving mechanism.

9. In combination, a lock frame, a locking member rotatably mounted in the frame, a lever pivoted to the frame for movement to and from contact with said member, an arm mounted for pivotal movement adjacent to the lever, a spring connected at its ends to the arm and lever and normally pivoting the arm inwardly into contact with said member, and a cam on the member disposed to engage and pivot the arm outwardly when the member is rotated to bring the cam therebeneath, the spring permitting such outward pivotal movement of the arm independently of the lever.

10. The combination defined in claim 9 plus means for holding the lever in contact with the member, and coin controlled means for releasing the last named means and permitting outward pivotal movement of the lever with the arm.

11. Checking locker mechanism comprising in combination, a door, a movable bolt for locking the door in closed position, key operated mechanism for moving the bolt to door locked and unlocked positions, means including a movably mounted abutment and a member disposed to engage the abutment and retain the bolt in either of said positions and prevent its movement to the other position when the abutment is in any of a plurality of predetermined positions, means mounting the abutment for movement consecutively to said predetermined positions and to a zero position wherein the abutment is inoperative to prevent movement of the bolt to said other position, coin receiving mechanism, and means including coin controlling mechanism cooperating with the first named means for moving said abutment from any of said predetermined positions to the zero position and releasing the bolt and permitting its movement from either of said positions to the other position when a predetermining number of coins of predetermined value are deposited in the coin receiving mechanism.

12. The combination defined in claim 11 in which said bolt and key-operated mechanism are embodied in a self-contained lock unit, means providing a coin slot in the unit for receiving said predetermined cash amount to be deposited, a shutter, means including a spring normally moving the shutter to coin slot closing position when the lock is in locked position, and means for moving the shutter to open slot position when the bolt is moved in unlocking direction from said locked position.

13. The combination defined in claim 11 plus means including a pivotally mounted element operatively associated with said abutment and having teeth cooperating with teeth movable with the bolt for automatically returning the abutment to one of said predetermined positions when the bolt is moved from the door locked position to the unlocked position.

14. Checking locker mechanism comprising in combination, a door, a movable bolt for locking the door in closed position, key operated mechanism for moving the bolt to door locked and unlocked positions, means including a movably mounted abutment and a member disposed to engage the abutment and retain the bolt against movement from locked position to unlocked positon when the abutment is in any of a plurality of predetermined positions, means mounting the abutment for movement consecutively to said predetermined positions and to a zero position wherein the abutment is inoperative to prevent movement of the bolt to said unlocked position, coin receiving mechanism, and means including coin controlling mechanism cooperating with the first named means for moving said abutment from any of said predetermined positions to the zero position and releasing the bolt and permitting its movement from said locked to unlocked position when a predetermined number of coins of predetermined value are deposited in the coin receiving mechanism.

References Cited in the file of this patent

UNITED STATES PATENTS

| | | |
|---|---|---|
| 1,110,664 | Wyckoff | Sept. 15, 1914 |
| 1,136,198 | Wyckoff | Apr. 20, 1915 |
| 2,603,335 | Beimel | July 15, 1952 |
| 2,675,107 | Garver | Apr. 13, 1954 |
| 2,805,747 | Maurer | Sept. 10, 1957 |